United States Patent [19]

Nightingale

[11] Patent Number: 4,502,637

[45] Date of Patent: Mar. 5, 1985

[54] TURBOMACHINE EJECTOR NOZZLE WITH THRUST REVERSER

[75] Inventor: Douglas J. Nightingale, Atlanta, Ga.

[73] Assignee: Rolls-Royce Inc., New York, N.Y.

[21] Appl. No.: 386,188

[22] Filed: Jun. 7, 1982

[51] Int. Cl.³ ............................ F02K 1/12; F02K 1/09; F02K 1/28

[52] U.S. Cl. ............................ 239/265.17; 239/265.25; 239/265.39

[58] Field of Search ..................... 239/265.17, 265.19, 239/265.25–265.29, 265.33, 265.37–265.41; 60/226.1, 226.2, 229, 271; 244/12.5, 23 D

[56] References Cited

U.S. PATENT DOCUMENTS 2,955,418 10/1960 David et al. .................. 239/265.17
4,382,551 5/1983 Thayer ........................... 60/226.2 X Primary Examiner—Andres Kashnikow
Attorney, Agent, or Firm—Cushman, Darby & Cushman

[57] ABSTRACT

An ejector nozzle for a turbomachine comprising fixed inner and outer ducts 16,19 to the downstream ends of which is provided mechanism for varying the geometry and area of the nozzle. A plurality of flaps 20, 20(a) which slide in curved tracks 21 are provided to define the throat of the nozzle. An axially movable shroud 25 is provided downstream of the outer duct 19. A plurality of second flaps 23, 23(a) are pivotally attached to the downstream ends of the flaps 20, 20(a) and to the downstream end of the shroud 25. The second flaps 23, 23(a) having openings therein and doors 30 to close the openings 29. Links 31 which are connected to the shroud 25 are used to open and close the doors 30. By sliding the flaps 20, 20(a) in their tracks 21, and translating the shroud axially the geometry of the nozzle can be altered to cater for "dry", "reheat" and "ejector" modes of operation. In the "ejector" mode the shroud is moved rearwards to uncover air inlets and the links 31 push open the doors of the nozzle throat. The flaps 20, 20(a) can be moved to a thrust reverse position whereby the hot gases flowing through the nozzle can be redirected out of the air inlet openings. A two dimensional nozzle is also disclosed in which the plurality of flaps 20 are replaced by a pair of mutually confronting arcuate flaps 20 and the circumferential array of flaps 23 is replaced by a pair of flaps 23.

6 Claims, 6 Drawing Figures

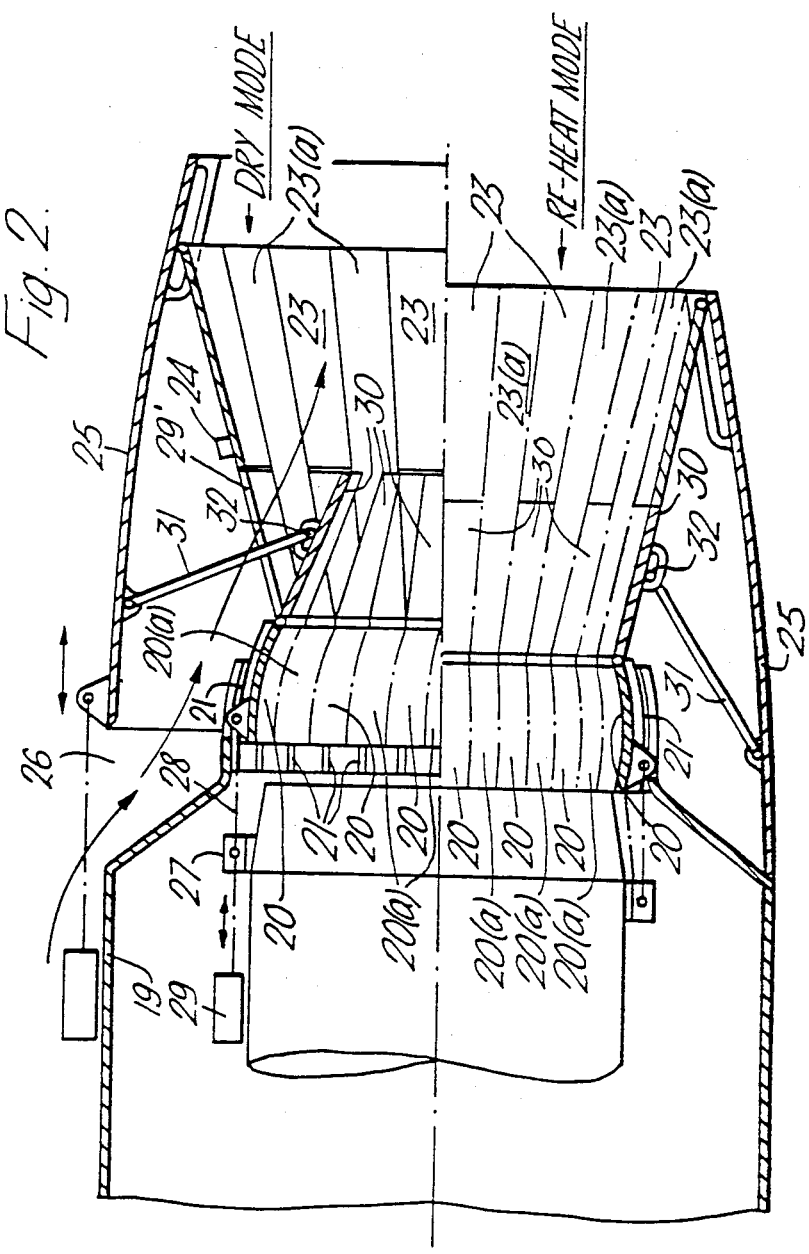

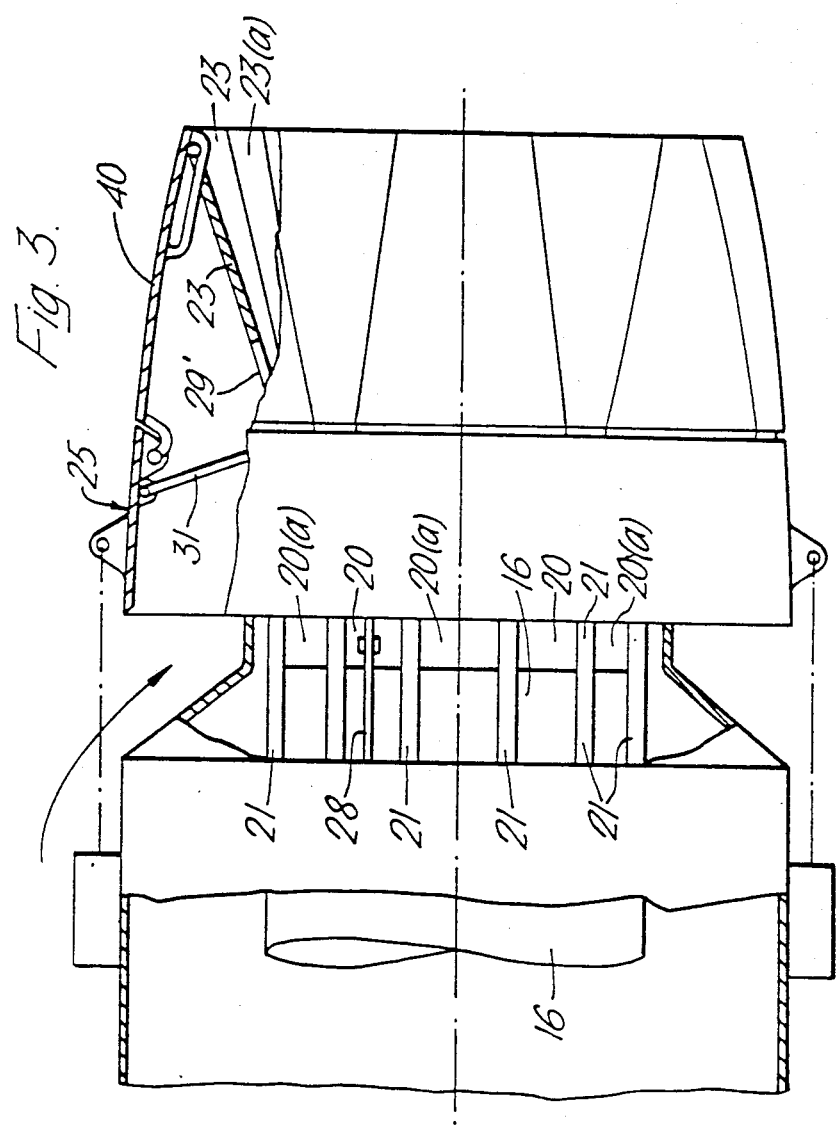

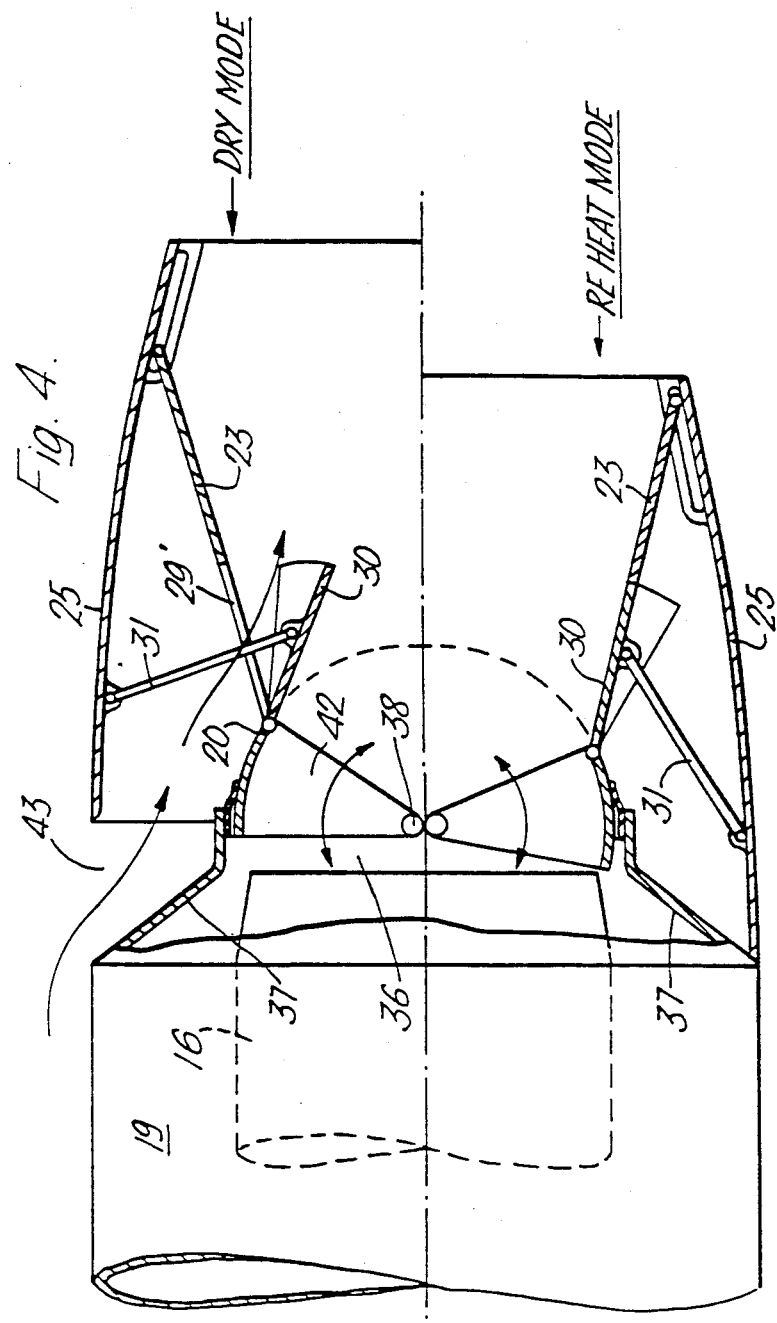

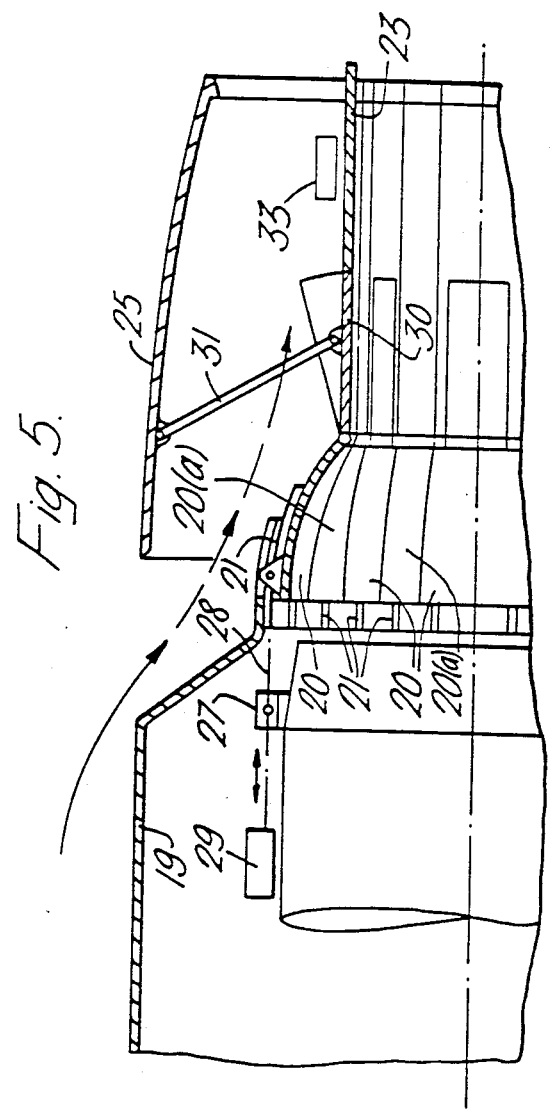

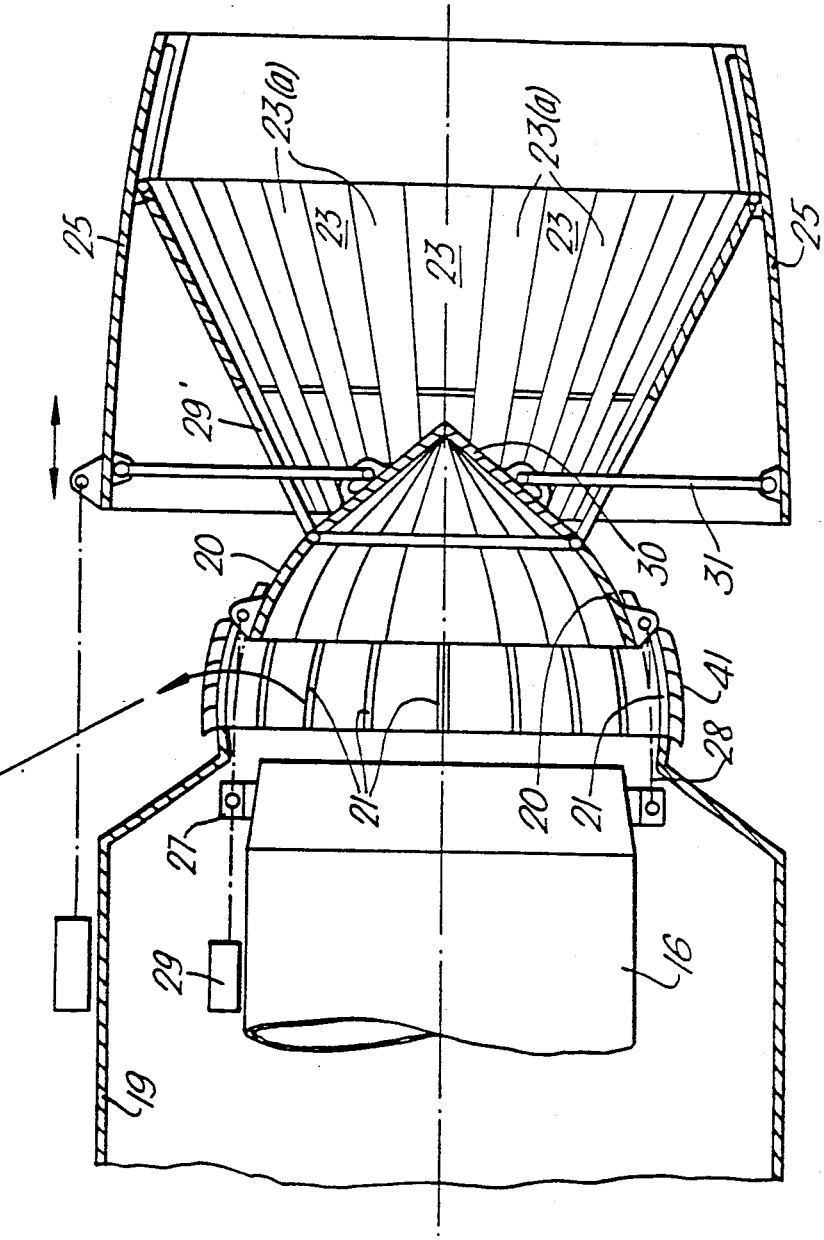

TURBOMACHINE EJECTOR NOZZLE WITH THRUST REVERSER

This invention relates to nozzles for gas turbine aero-engines and is particularly concerned with variable geometry nozzles and the suppression of the infra red radiation emitted by the hot exhaust plume of such engines.

Modern combat aircraft require the flexibility of being able to fly at subsonic or supersonic speeds and to perform a variety of roles. In some roles it is necessary to augment the basic thrust produced by the engine in the "dry" mode by burning additional fuel downstream of the engine's turbines, utilizing the unburnt oxygen in the exhaust gases to support combustion. This mode is known as reheat or after-burning. During re-heat it is necessary to increase the area of the nozzle to accommodate the increased volume of gases so as not to impair the efficient functioning of the engine. In other roles such as supersonic cruise, it is desirable to vary the geometry of the exhaust nozzle of the engine from a convergent geometry for subsonic speed to a configuration having an increased area throat (compared to that required during the "dry" mode or at subsonic cruise) formed between a convergent and divergent part of the nozzle—often referred to as a con-di nozzle.

There are times during the flight envelope of an aircraft when re-heat is not required and when the prime requisite is to reduce the infra red emission of the exhaust plume and thereby reduce or avoid detection by heat seeking missiles directed towards the aircraft. These missiles usually detect the infra-red radiation of the hot exhaust gas plume and once the plume is located home in on the hot parts of the engine to destroy the aircraft.

There is a need for a nozzle design that not only caters for dry and reheat modes of operation, but also enables one selectively to reduce the infra-red emission of the engine.

An object of the present invention is to provide a variable geometry nozzle which is capable of use both in the dry and reheat modes of operation and also capable of reducing the infra-red emission of the hot exhaust gas plume.

The invention as claimed enables one to vary the geometry off the nozzle to cope with dry and reheat modes of operation by moving the flaps and enables one to reduce the infra-red emission by opening additional air inlets which admit ambient air to cool and shield the hot exhaust plume.

The nozzle of the present invention may be installed on a fixed jet pipe or on a vectorable jet pipe. Furthermore, the nozzle of the present invention may be installed on the vectorable front nozzles of an engine such as the Rolls-Royce Limited Pegasus engine which discharge cold or reheated by-pass air.

The invention will now be described by way of an example with reference to the accompanying drawings in which:

FIG. 2 illustrates in greater detail a cross-sectional view of part of the rear nozzle of the engine of FIG. 1.

FIG. 3 illustrates the nozzle of FIG. 2 provided with a modified shroud.

FIGS. 4, 5 and 6 illustrate alternative designs of nozzle to that shown in FIG. 2 constructed in accordance with the present invention.

Figure 1:
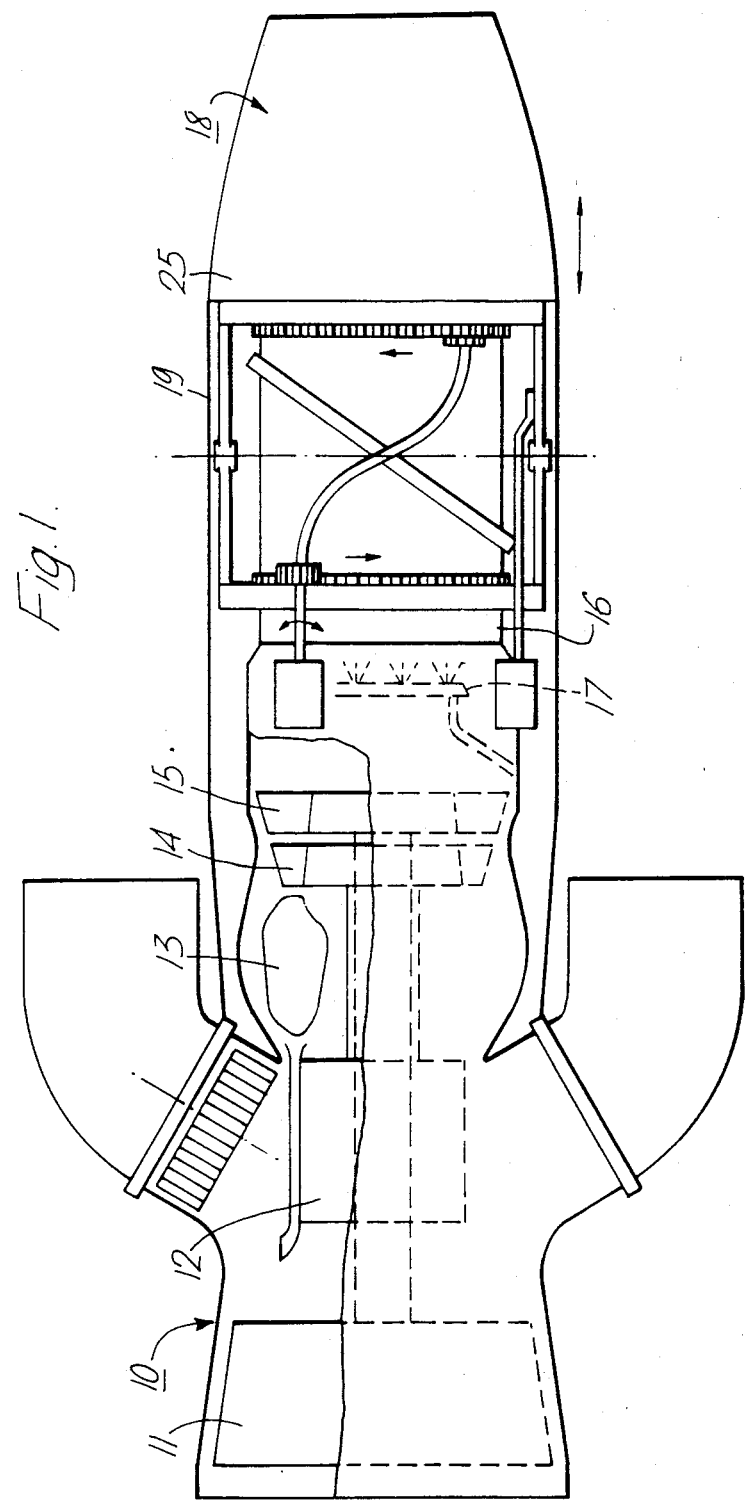
FIG. 1 illustrates schematically a gas turbine engine fitted with a variable geometry nozzle constructed in accordance with the present invention.

Referring to FIG. 1 there is shown schematically a gas turbine aero engine 10 comprising in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, a jet pipe 16 having a reheat burner 17, and a variable geometry nozzle 18 constructed in accordance with the present invention.

Referring to FIG. 2 the nozzle comprises two spaced ducts constituted by the jet pipe 16 and an outer casing 19. A circumferential array of first flaps 20 is provided downstream of the jet pipe 16.

Each of the flaps 20 is mounted to slide in curved tracks 21 and alternate flaps 20(a) overlap adjacent flaps 20 to form seal plates that close off the circumferential gaps between the adjacent flaps 20.

Located downstream of the flaps 20 is circumferentially extending array of spaced flaps 23. Each of the flaps 23 is pivotally attached at its upstream end to the downstream end of one of the flaps 20. Here again alternate flaps 23(a) constitute seal plates that seal off the gaps between adjacent flaps 23. The seal plates 23(a) are pivotally connected at their upstream ends to the downstream end of the flaps 20(a). The flaps 23(a) are provided with rollers 24 that are mounted on a flange on the flap 23(a) that projects through the gap between adjacent flaps 23. The rollers 24 engage the outer surface of adjacent flaps and prevent both the seal plates 23(a) and the seal plates 20(a) from falling inwards. The downstream ends of the flaps 23 and 23(a) are pivotally attached to the shroud in slots which allow the flaps to slide relative to the shroud.

The axially movable shroud 25 is provided downstream of the duct 19. An air inlet opening (or openings) 26 is provided at the downstream end of the duct 19. The opening 26 may extend around the whole circumference of the duct 19 or around part.

The flaps 20 and 20(a) are provided with a means, such as a unison ring 27 and links 28 operated by screw jacks 29, so that they can be slid along the curved tracks 21 independently of the movement of the shroud 25. Other means of operating the flaps 20 and 20(a) could be employed such as pinion gears which engage racks on the outer surface of the flaps.

Some, but not necessarily all, of the flaps 23 (for example alternate ones) are provided with openings 29' which are closed by doors 30. Each of the doors 30 are flaps which are pivotally attached at their upstream end edge to the respective upstream edge of the second flap 23 and/or to the downstream edge of the respective first flap 20 on the same axis of the pivotal attachment of its respective second flap 23 to the first flaps 20. Each door 30 has pivotally attached to it, a link 31 which slides in a slot 32 on the door. The links 31 are pivotally attached to the shroud 25.

For a "dry" mode of operation, the shroud 25 is moved rearwardly and the flaps 20, 20(a) moved along their tracks 21 to define a convergent part of the nozzle with minimum throat. In this position, shown by the top part of FIG. 2, the flaps 23, 23(a) define a divergent portion. The length of the links 31 is chosen to hold the doors 30 open in this mode of operation. Ambient air is sucked into the nozzle flow path through the open doors 30, and the open doors 30 define a mixer that intermixes the hot turbine exhaust gases with the cooler ambient air. This reduces the infra-red emission of the gas plume. Furthermore the doors 30 restrict the direct view of the hot turbines from the rear of the engine.

To operate in a reheat mode the flaps 20 are moved along their tracks 21 to define a reselected area of throat that is larger than the required for subsonic dry mode and the shroud 25 is simultaneously moved forwards. The shroud closes off the opening 26 and the flaps 20 and 23 define a convergent and slightly divergent nozzle. The doors 30 are held closed by the links 31.

For unreheated supersonic cruise conditions a convergent-divergent nozzle is formed by retaining the shroud 25 in its foremost position and rotating the flaps 20 to the "dry" setting. This movement pulls the upstream ends of the flaps 23 inwards to define a more divergent part of the nozzle downstream of the throat than is required during the subsonic "dry" mode described above.

Referring now to FIG. 3, the nozzle shown differs from that shown in FIG. 2 in that the shroud 25 has a circumferential array of overlapping flaps 40, hingeably attached to the forward fixed part of the shroud. Flaps 23, 23(a) and 40 are thus able to move together, either increasing or decreasing the nozzle exit area as determined by the differential pressures acting on the exposed surfaces.

Referring now to FIG. 4 the nozzle differs from that shown in FIGS. 2 and 3 in that it is basically a two dimension nozzle. Instead of employing an axisymmetric array of arcuate flaps 20 only one pair of larger mutually confronting flaps 20 are provided and only two second flaps 23 are employed.

The inner and outer ducts 16 and 19 are of rectangular cross section as is the shroud 25. The side walls 36 of the duct 16 extend beyond its upper and lower walls 37. The flaps 20 are located between the side walls 36 downstream of the upper and lower walls 37 and are connected by side members 42 to trunnions 38 which extend along a transverse axis of the duct 19. Mounted on the downstream edge of each flap 20, is a second flap 23 and each flap 23 has an opening and a door 30 as described above in connection with the nozzle of FIG. 2.

Rotation of the flaps 20 in the trunnions 38 varies the throat area and moves the upstream ends of the flaps 23 inwards and outwards.

Axial movement of the shroud 25 rearwards forms an opening 43 downstream of the duct 19 and the links simultaneously open the doors 30 as described above in relation to FIG. 2.

Rotation of the flaps 20 to bring their downstream edges together forms a thrust deflector door that redirects gases flowing through the jet pipe 16 out of the opening 43 to reverse the thrust produced by the engine.

Links 31 may be telescopic in order to allow for the full unrestricted movement of the shroud. The said links would then be fully compressed to form rigid struts to hold the doors 30 in the open position as described. Said telescopic struts may be spring loaded to ensure that the doors are held shut when required.

The doors 30 are modified as shown in FIGS. 4 and 5 to be in the form of a chute with rounded edges which may be beneficial to encourage forced mixing of the gas stream with the entrained air in an efficient manner.

In a modification of the invention as shown in FIG. 5, movement of flaps 23, (23(a)) may be achieved by means of a suitable mechanism such as a conventional hoop tensioner shown diagrammatically at 33 in FIG. 5. The downstream ends of the flaps 23, 23(a) are not attached to the shroud 25 but are movable independently of the latter as governed by the said mechanism thus allowing for "dry" operation of the nozzle without necessarily having the ejector doors 30 open. In the "dry" mode of operation when infra-red suppression is not required, shown by the top part of FIG. 5, the flaps 23, 23(a) define a slightly divergent portion. The links 31 then hold all of the doors closed when the shroud is located rearmost and the flaps 20 define the minimum area throat. In this position of the shroud 25, the inlet 26 is open and ambient air entering the void between the shroud 25 and the flaps 20, 23 leaves via the (annular) gap between the downstream ends of the shroud and the flaps 23, (23(a)).

By moving the flaps 20 forwards from a minimum throat area position to a larger throat position with the shroud still rearwards, and the opening 26 uncovered, the upstream edges of the flaps 23 and 23(a) are moved outwards and the links 31 push the doors 30 open. Ambient air is sucked into the nozzle flow path through the open doors 30 which define a mixer that intermixes the hot turbine exhaust gases with the cooler ambient air. This reduces the infra-red emission of the gas plume. Furthermore the doors 30 restrict the direct view of the hot turbines from the rear of the engine.

Referring now to FIG. 6, the nozzle shown is different from that shown in FIGS. 2 and 3 in that it includes means for achieving reverse thrust. The tracks 21 are of increased length such that flaps 20, 20(a) can be moved rearwards to uncover a circumferential opening between the downstream end of the jet pipe 16 and the upstream ends of flaps 20, 20(a). The opening thus formed is fitted with an array of cascade vanes 41 to redirect the gas flow as required. The vanes may be integral with the tracks 21 if desired. To achieve reverse thrust, the flaps 20, 20(a) and the shroud 25 are moved beyond their "dry" mode position until the downstream ends of the doors 30 are brought together to obturate the jet pipe 16 and deflect the gas flow through the cascade 41 and out of the exit inlet opening 26.

I claim:

1. A nozzle for a gas turbine aero-engine comprising spaced inner and outer ducts, one or more air inlet openings located at the downstream end of the outer duct, a movable shroud extending downstream of the outer duct, a plurality of first flaps each of which is constrained to move along a curved path, a plurality of second flaps each of which is pivotally attached to the downstream end of one of the first flaps at least some of the second flaps being provided with an opening therein and a door in each opening, each door being pivotally attached at its upstream end to a region adjacent the upstream end of the second flaps, a plurality of links each of which is pivotally attached at one end to the shroud and pivotally attached at its other end to a door, a first actuation means operable on the first flaps to translate them in unison along the curved path thereby to define a convergent throat of the nozzle and simultaneously move the upstream ends of the second flaps, and a second actuation means operable on the shroud to move the shroud to and from a first position, where the shroud obturates the said inlet opening or openings, to and from a second position, downstream of the first position, where the shroud uncovers the said inlet opening or openings, alters the position of the second flaps and simultaneously causes the said links to push the doors open thereby to form a mixer region downstream of the throat whereby air entering the air inlet opening or openings and the openings in the second flaps intermixes with hot gases flowing through the throat of the nozzle.

2. A nozzle according to claim 1 wherein the doors are pivotally attached to the upstream edge of the second flap.

3. A nozzle according to claim 1 wherein the doors are pivotally attached to the downstream edge of the first flaps.

4. A nozzle according to claim 1 wherein alternate flaps of each array of first and second flaps overlap adjacent flaps and constitute sealing plates to close off the gaps between adjacent flaps, and means are provided for constraining the sealing plates from falling inwards.

5. A nozzle according to claim 1 wherein the shroud comprises a hollow cylindrical upstream portion, a downstream portion of the shroud comprises a plurality of third flaps pivotally attached to the upstream portion of the shroud, and the second flaps are pivotally attached at their downstream end to the downstream end of the third flaps.

6. A nozzle according to claim 1 wherein the first flaps comprise a pair of mutually confronting plates each of which is mounted to rotate about an axis extending transverse to the length of the inner duct, and the second flaps comprise a pair of mutually confronting flaps adapted to move between side walls defined by the shroud.

* * * * *

UNITED STATES PATENT AND TRADEMARK OFFICE
CERTIFICATE OF CORRECTION

PATENT NO. : 4,502,637

DATED : March 5, 1985

INVENTOR(S) : Douglas John Nightingale

It is certified that error appears in the above-identified patent and that said Letters Patent is hereby corrected as shown below:

Column 3, line 36, delete "16" and insert --19--

Signed and Sealed this

Eighth Day of October 1985

[SEAL]

Attest:

DONALD J. QUIGG

Attesting Officer

Commissioner of Patents and
Trademarks—Designate